United States Patent [19]

Rathgeber

[11] Patent Number: 4,871,954
[45] Date of Patent: Oct. 3, 1989

[54] ACTUATING MEANS FOR A FLAP IN MOTOR VEHICLES

[75] Inventor: Gerhard Rathgeber, Pliening, Fed. Rep. of Germany

[73] Assignee: Bayerische Motren Werke A.G., Munich, Fed. Rep. of Germany

[21] Appl. No.: 668,382

[22] PCT Filed: Feb. 9, 1984

[86] PCT No.: PCT/EP84/00033
§ 371 Date: Oct. 18, 1984
§ 102(e) Date: Oct. 18, 1984

[87] PCT Pub. No.: WO84/03369
PCT Pub. Date: Aug. 30, 1984

[30] Foreign Application Priority Data

Feb. 18, 1983 [DE] Fed. Rep. of Germany ....... 3305725

[51] Int. Cl.$^4$ .............................................. G05D 3/10
[52] U.S. Cl. .................................................. 318/466
[58] Field of Search ...................... 318/466, 696, 685

[56] References Cited

U.S. PATENT DOCUMENTS 3,755,727 8/1973 Schifalacqua .................... 318/466 X
4,401,928 8/1983 Kamijo et al. ...................... 318/466

FOREIGN PATENT DOCUMENTS 1763924  8/1973  Fed. Rep. of Germany ...... 318/466
58-203521 11/1983 Japan .................................... 318/466
0456257  2/1975  U.S.S.R. .............................. 318/466
0606899  8/1948  United Kingdom ................ 318/466
2072379  9/1981  United Kingdom .
2130758  6/1984  United Kingdom ................ 318/466

Primary Examiner—Bentsu Ro

[57] ABSTRACT

An actuating mechanism for a flap in motor vehicles which, by means of an electric step motor, adjusts the flap between two end positions determined by limit stops to selectable intermediate positions corresponding to a regulating command. In order to compensate step losses, the regulating command, when the flap is adjusted in one end position, corresponds to an adjustment that exceeds the magnitude of the command this end position.

2 Claims, 1 Drawing Sheet

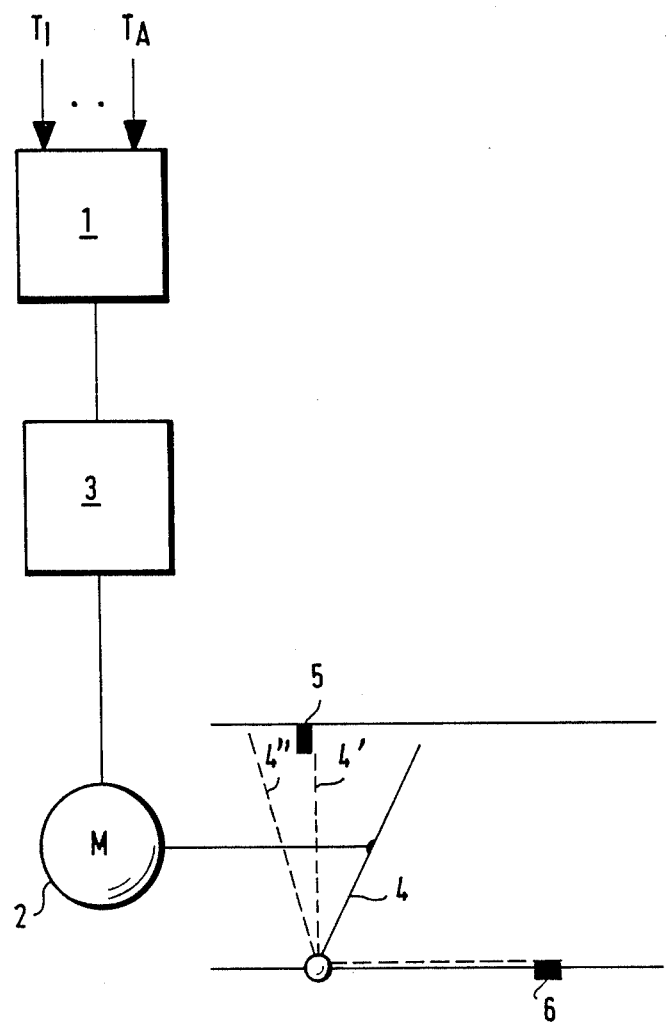

ACTUATING MEANS FOR A FLAP IN MOTOR VEHICLES

This invention relates to an actuating means for a flap in motor vehicles, having an electric motor adjusting the flap between two end positions fixed by limit stops in selectable desired positions corresponding to a regulating command. The flap may, for example, be a throttle valve in the intake system of the internal-combustion engine or an air flap of a heating or air-conditioning unit.

It is known to provide such flaps within the framework of a servo system with a position indicator which reports the position of the flap back to a control device. The position indicator may be contacting or non-contacting. Both are known from DE-OS 31 10 949.

Actuating means of this type are high in cost with respect to components on the basis of the position indicator and with respect to regulating technology on the basis of the servo system.

The invention has the objective of providing an actuating means of the type initially mentioned which is clearly simplified in respect to components as well as to regulating technology.

According to the invention, this objective is achieved by provision of a motor which is a step motor and by provision of a flap which is adjusted to an end position, the regulating command corresponding to an adjustment that exceeds the end position.

Because the actuating means is configured as an open loop, a position indicator and a servo system are no longer required. For adjusting the flap to the desired position, it is only necessary to report to the step motor the required number of steps. However, step motors have the disadvantage that in circumstances involving, for example, an excessive start/stop frequency, interfering impulses or mechanical overloading, steps may be lost. This danger is avoided according to the invention in that, when one end positon is adjusted, a step number is reported to the step motor which is higher than the number required when the step motor works without fault. Thus if steps were lost, this loss will be balanced because, by means of this excess step number, the end position of the flap will be reached independable fashion.

It is possible to provide this excess step number for only one end position of the flap. On the other hand, a more rapid correction of possible position errors is achieved by the fact that in the other end position a corresponding excess step number is provided. If the two end positions are encountered with equal frequency, this results in a correction of possible position errors of the flap that is twice as fast.

By means of a further development of the invention, another problem is to be solved that may be connected with the use of a step motor. It is possible to secure the adjustment of the flap in the rest phases by means of a storage unit. Such a storage unit requires a current supply especially in rest phases of the automobile. This disadvantage can be eliminated by means of the fact that such a storage unit is not operative in the rest phases and the first adjustment of the flap after such a rest phase is carried out in such a way that the motor is first adjusted to this end position and the desired position is adjusted from this end position. It is true that this measure in principle is known from DE-OS 31 07 442 for a heating or air conditioning system for a building. However, this measure is carried out at any change of the adjustment of the flap also during a continuous operational phase. This is completely useless for a motor vehicle since, for example, when the flap is developed as a throttle valve, before each position change, the adjustment of the flap would have to be carried out to idling, or full throttle operation.

This one-time adjustment of the flap at the start of an operational phase can be carried out in different ways. Thus the end position to be adjusted may be indicated as one of the two possible end positions. In contrast, a much faster adjustment may be obtained by, in each case, selecting that end position that is closest to the desired position.

These and other objects, features, and advantages of the present invention will become more apparent from the following description when taken in connection with the accompanying drawings which show, for the purposes of illustration only, one embodiment in accordance with the present invention, and wherein:

As shown, the system contains a control device 1 which on the basis of the incoming parameters, such as temperatures of inside and outside air, and of the selected program calculates the controller output for the actuators of the system. One of the actuators is a step motor 2 which is connected to the control device 1 via a step emitter 3. The step motor 2 controls an air flap 4 which is, for example, connected with the atmosphere and controls the entry of fresh air into the interior of the vehicle. The step emitter 3 adjusts the air flap by means of the step motor 2 between two end positions fixed by stops 5 and 6 in, for example, one hundred uniform steps, and therefore passes through the whole, approximately 90° adjusting angle of the air flap 4.

The adjustment of the air flap 4 outside the end positions determined by the stops 5 and 6 takes place in the conventional manner during an operational phase of the motor vehicle. Corresponding to the required change of the adjustment of the air flap 4, the step motor 2, controlled by the control device 1 and translated by the step emitter 3, is acted upon by a corresponding number of forward or backward steps. Only at the start of the operational period when the adjusted position of the air flap 4 is not available in a stored manner, is the desired adjustment of the air flap 4 carried out in such a way that—caused by the control device 1—the step motor 2 brings the air flap 4 first into one of the end positions determined by the stops 5 and 6, and from there goes into the desired position. In this case that end position is selected that is closest to this desired position of the air flap 4, i.e. which in the present case can be reached with a maximum of fifty steps. The initial adjustment of the end position takes place in such a way that the step motor 2 is acted upon by a number of steps in the desired moving direction of the air flap 4 which is at least equal to the total number of steps for passing through the adjusting range of the air flap 4, which in the present case is one hundred steps.

In order to compensate the possible loss of steps caused during an operational period because of a lacking position indicator for the air flap 4, during each adjustment of the air flap 4 in the end positions fixed by the stops 5 and 6, in the case of the above-described initial adjustment, a number of steps is supplied to the step motor 2 which is larger than the number of steps required when the actuating means operates without error. If the stops 5 and 6 were lacking, this would mean in the case of the error-free operation, that the air flap 4 would be adjusted beyond the end position. For example, it would then, instead of the indicated position 4' determined by stop 5, take up position 4". The stop 5 prevents this while the construction and method of operation of a step motor may be selected to be such that this actual failure to carry out the moving steps of the air flap 4 does not result in excessive mechanical stress impairing the functional efficiency of the air flap 4 or its mechanical connection with the step motor 2.

Without a storage unit operating outside the operational phases and an emitter for the actual position of the air flap that operates within the operational phases, there is therefore always a precise adjustment of the air flap because at the start of an operational phase, a selfadjustment takes place and step errors during an operational phase are always corrected. This also has the advantage that an assembly is facilitated because no attention has to be paid to the basic adjustment of the air flap 4 and of the step motor 2.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. An actuating mechanism for a flap in motor vehicles, having an electric step motor for adjusting the flap between two end positions fixed by limit stops, the flap being adjustable to a desired position corresponding to a regulating command, further comprising:

means for transmitting a command signal to the step motor, the magnitude of the signal exceeding the magnitude which would be necessary to adjust the flap to a first one of said end positions; and wherein at the time of the initial switching-on of the mechanism, the means for transmitting transmits a said command signal to the step motor to adjust the flap to said first one of said end positions which is closest to the desired position and subsequently to adjust the flap to the desired position intermediate the two end positions.

2. An actuating mechanism according to claim 1 wherein the means for transmitting serves to adjust the flap to a second one of said end positions by transmitting a signal, the magnitude of which exceeds the magnitude which would be necessary to adjust the flap to the second one of said end positions.

* * * * *